United States Patent Office 2,993,531
Patented July 25, 1961

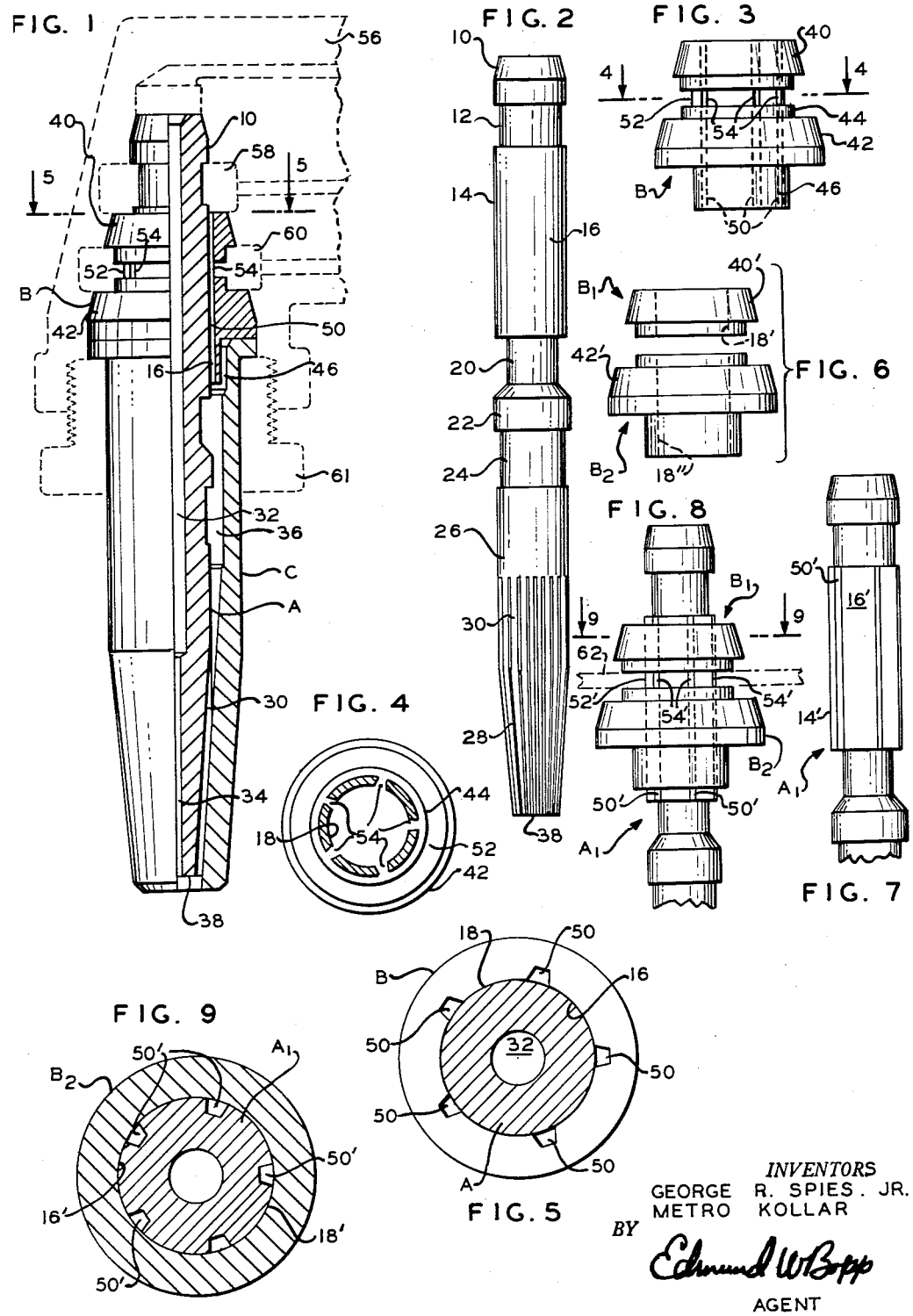

2,993,531
TORCH TIPS AND METHODS OF MAKING SAME
George R. Spies, Jr., Murray Hill, and Metro Kollar, Bayonne, N.J., assignors to Air Reduction Company, Incorporated, New York, N.Y., a corporation of New York
Filed Apr. 13, 1959, Ser. No. 806,139
3 Claims. (Cl. 158—27.4)

The invention relates to improvements in tips for gas torches used for cutting or heating metal pieces, and to improved methods for making such tips. More particularly, the invention is directed to improvements in the manufacture of torch tips of the type wherein heating gases are mixed within the tip as disclosed by Hughey in Patent No. 2,468,824, granted May 3, 1949.

Torch tips of the type under consideration comprise an insert having a central cutting gas passage and a plurality of circumferentially spaced, longitudinally extending slots formed in the circular, exterior face of the cylindrically-shaped insert. For at least a portion of their length, the slots are enclosed by a surrounding, tightly fitting seat ring unit to provide heating gas passages. The seat ring unit is provided with a pair of longitudinally spaced seat portions to accommodate portions of the torch head to furnish separate chambers of entry for heating oxygen and another gas, such as propane. In order to convey and mix the propane or a like gas to and with the heating oxygen, gas passages or metering ports are individually drilled through the wall of the seat ring for communication with each of the longitudinally extending gas passages. The mixed gases subsequently expand in a chamber provided therefor by a shell surrounding the insert below the seat ring.

The manufacture of torch tips of this type has presented several problems and difficulties. It is difficult to satisfactorily align the drilled holes in the seat ring unit with the longitudinally extending slots or passages with which the holes must be placed in communication. The alignment problem is present whether the holes are drilled in the seat ring unit before or after assembly of the seat ring unit with the insert. Drills have a tendency to wander, and when it is considered that the intersecting passages are on the order of size of only approximately 0.040 inch in diameter, it will be readily apparent why it is difficult to attain an accurate and uniform cross section at the area of intersection of the openings. The accuracy and uniformity of the cross-section of the intersecting passages have an important bearing upon the uniformity of gas mixing and distribution and affect the combustion quality of the torch tip. Moreover, there is the problem of burr removal from a drilled hole. Failure to completely remove the burrs raised in drilling the holes further impairs the desired accuracy and uniformity, and fully removing burrs from a circumscribed aperture is more painstaking than removing burrs from an open-sided groove or slot.

The primary objectives of the invention are to provide a torch tip wherein the problems and difficulties attending the formation and alignment of the gas passages and the metering ports as outlined above are entirely eliminated.

In accordance with the invention, gas passages or metering ports are formed in or provided by the seat ring in a manner which assures perfect alignment with the equally small longitudinally extending slots or gas passages. The cross-sectional area at the intersection of the passages is accurate and uniform. Drilling is eliminated. Burrs may be removed at a stage of manufacture where it is most convenient to do so. The problem of alignment is obviated. The cost of manufacturing the product is greatly reduced, aside from greatly reducing the number of rejects. The performance quality of the tip is greatly improved.

These, and other objects and advantages of the invention will be apparent from the following detailed description of several preferred embodiments of the invention, taken in conjunction with the drawing, in which:

FIG. 1 is a side elevational view partly broken away and in section, showing a multi-piece torch tip made in accordance with the invention;

FIG. 2 is a side elevational view of the insert element of the torch tip shown in FIG. 1;

FIG. 3 is a side elevational view of the seat ring element prior to its assembly with the insert shown in FIG. 2;

FIG. 4 is a horizontal cross-sectional view taken approximately in the plane of line 4—4 of FIG. 3;

FIG. 5 is a horizontal cross-sectional view taken approximately in the plane of line 5—5 of FIG. 1;

FIGS. 6 to 9 illustrate another form of the invention, FIG. 6 showing a two-part form of seat ring unit;

FIG. 7 is a partial side elevational view of an insert adapted for assembly with the two-part seat ring unit of FIG. 6;

FIG. 8 is a partial side elevational view showing the assembly of the seat ring unit parts illustrated in FIG. 6 with the insert of FIG. 7; and FIG. 9 is a horizontal cross sectional view taken approximately in the plane of line 9—9 of FIG. 8.

Referring to the drawing, the torch tip comprises an insert A, a seat ring unit B and a shell or sleeve C. The insert, which is cylindrical in shape, is provided at its top end with a tapered seat portion 10, a channel 12 of reduced diameter and a seat ring bearing portion 14. The seat ring bearing portion is of cylindrical shape and has a circular external face 16. The seat ring unit B, having an internal bore of a diameter substantially equal to the diameter of the seat ring bearing portion 14, is tightly secured upon the seat bearing portion by shrinking, force fitting or soldering. The seat bearing portion may have a length substantially equal to the height of the seat ring unit as shown, or the seat bearing portion may have a substantially greater length. The seat ring unit provides an internal face 18 which closely adjoins the external face 16 of the insert's seat ring bearing portion when the parts are assembled with one another. Below the seat ring bearing portion, the insert is provided with an annular channel 20, a collar portion 22, a channel 24, a section of increased diameter 26, and a tapered portion 28, in that order. The tapered portion may be fluted by forming spaced, longitudinally extending grooves or channels 30 therein, which may extend into the portion 26. The insert is provided with the usual central bore 32 and a communicating restricted passage 34 for the delivery of the cutting gas.

As shown in FIG. 1, an annular expansion chamber 36 is provided between the seat bearing portion 14 and the fluted area 30 when the shell C is positioned upon the insert and in engagement with the seat ring. The shell preferably extends a short distance beyond the lower extremity 38 of the insert. It will be understood that below the seat ring unit, the insert may possess any desired contour consistent with a structure allowing the expansion of the mixed heating gases, and the delivery of such mixture to the area where the cutting gas is delivered by the tip.

The seat ring unit B is of the double seat type, and has two longitudinally spaced seat portions 40 and 42 with an intermediate annular channel 44. The seat ring may be provided with an extension 46 of reduced diameter below the seat portion 42.

The passages for conveying one of the heating gases, such as heating oxygen, are provided by forming a plurality of circumferentially spaced, longitudinally extending slots in either the internal face 18 of the seat ring unit or the external face 16 of the insert. Where the slots are formed in the internal face of the seat ring unit, the closely adjoining circular and smooth or unbroken external face 16 of the insert encloses the slots to provide circumscribed gas passages. The adjoining faces are coextensive except at the gas passage areas. Similarly, when the longitudinally extending slots are formed in the external face 16, the closely adjoining, smooth face 18 encloses the slots to provide the gas passages.

In accordance with the invention, the metering ports for the second heating gas, such as propane, are formed and placed in perfectly aligned communication with the longitudinally extending slots or gas passages by simply providing an annular groove in the seat ring unit. The single, continuous groove extends transversely of and intersects the longitudinally extending gas passages.

In greater detail, and in accordance with the preferred embodiment of the invention as shown in FIGS. 1 to 5, the seat ring unit B is provided on its internal face 18 with a plurality of circumferentially spaced, longitudinally extending slots 50. In the form of the invention illustrated, five slots are shown. It will be understood, however, that any desired number of spaced slots may be formed in the seat ring unit. Preferably, the slots are formed into the internal diameter of the seat ring by a broaching operation; also, the slots are broached simultaneously in one operation, thereby further reducing the cost of manufacturing the product. The outside diameter of the seat ring is then cut or milled between seat portions 40 and 42 to provide an annular transverse groove 52 of a depth which exposes each of the slots 50, where the transverse groove intersects the spaced slots. At the resulting areas of intersection, an opening or port 54 is provided. The transverse groove is, of course, made of a width at the base thereof to provide ports of the desired small size.

In the form of the invention illustrated in FIGS. 1 to 5, the transverse, annular groove is cut into the seat ring unit prior to assembly of the seat ring unit with the insert. Thus, when the seat ring unit thus fabricated is tightly secured in position upon the seat bearing portion 14, the smooth external face 16 closes off the open sides of the longitudinally extending slots 50 to furnish the enclosed longitudinally extending gas passages, and the metering ports 54 now intersect the resulting gas passages. If desired, the longitudinally slotted seat ring unit may be tightly fitted upon the insert, and the transverse groove 52 cut into the insert after their assembly.

The perfectly aligned, longitudinally extending gas passages and intersecting metering ports enable uniform mixture and distribution of the heating gases. As shown in FIG. 1, when a torch head 56 is assembled with the described tip, a chamber 58 is provided for the heating oxygen or the like to enter the longitudinally extending passages, and mix with propane or the like entering the metering ports 54 from the fuel gas chamber 60 located between the seat portions 40 and 42. A tip nut 61 abuts a flange provided by the sleeve C, and secures the assembly tip in the torch head.

In the form of the invention illustrated in FIGS. 6 to 9, the insert, designated A′, may be exactly the same as previously described, except that the external face 16′, instead of being a smooth, unbroken circular surface as previously described, is provided with the longitudinally extending slots 50′. The seat ring unit is made in two separate parts, $B_1$ and $B_2$. The internal, cylindrical face of each part, 18′ and 18″, is smooth and unbroken. As shown in FIG. 8, the two seat ring parts are assembled on the seat bearing portion 14′, and longitudinally spaced from one another to provide a groove 52′ therebetween which intersects the grooves 50′ formed in the insert. As a result, enclosed, longitudinally extending gas passages are provided by the faces 18′ and 18″ coacting with the face 16′, and circumferentially spaced, intersecting metering ports 54′ are provided in the space or groove 52′ between the seat ring unit parts $B_1$ and $B_2$.

The seat ring parts are spaced apart to furnish the desired size of intersecting metering ports by force fitting or shrinking the seat ring unit part $B_1$ upon the seat bearing portion and firmly against a shim 62 of desired uniform thickness positioned upon the lower seat ring unit part $B_2$, the lower seat ring unit part having been previously secured upon the insert by a force fit or by soldering. The assembly is completed after removal of the shim. If desired, either the top or bottom seat ring unit part may be provided with integrally formed spacer lugs extending toward the opposite seat ring part, and of a length equal to the desired width of the groove. Upon assembly of the seat ring unit parts with the insert, the lugs would each be located between a pair of longitudinally extending gas passages. There is substantial area between adjacent slots or passages, and positioning the spacer lugs in such relatively large areas does not present any alignment problem.

It is believed that the advantages of the invention will be apparent from the foregoing detailed description of a preferred embodiment of the invention. The intersecting gas mixing or metering ports are made by a simple grooving operation, or by an assembly which does not entail drilling. Proper alignment of the small openings is accomplished, with the attendant achievement of uniform and accurate cross-sectional areas at the intersection of the openings. Any burrs formed in milling or broaching the open-sided slots and groove may conveniently be removed at any desired stage of manufacture. The cost of manufacturing the product is substantially reduced, and a uniformly high degree of performance is obtained from tips made in accordance with the described process of manufacture. It will be apparent that various modifications and changes may be made without departing from the spirit and scope of the invention as sought to be defined in the following claims.

We claim:

1. A torch tip comprising an insert having a seat ring bearing portion of circular cross-section and providing an external face, a seat ring unit tightly surrounding said seat ring bearing portion and providing a closely adjoining, coextensive internal face, the seat ring unit having two longitudinally spaced seat portions, a plurality of circumferentially spaced, longitudinally extending slots formed in one of said faces, the adjoining face enclosing the slots to provide gas passages, and means forming an annular, transverse groove between said seat portions in intersecting communication with each of said slots to provide circumferentially spaced ports.

2. A torch tip comprising an insert having a seat ring bearing portion of circular cross-section and providing an external face, a seat ring unit tightly surrounding said seat ring bearing portion and providing a closely adjoining, coextensive internal face, the seat ring unit having two longitudinally spaced seat portions and an intermediate channel, a plurality of circumferentially spaced, longitudinally extending slots formed in said internal face, the adjoining external face enclosing the slots to provide gas passages, and an annular, transverse groove formed within said channel of a depth to communicate with each of said slots to provide circumferentially spaced ports.

3. A torch tip comprising an insert having a seat ring bearing portion of circular cross-section and providing an external face, a plurality of circumferentially spaced, longitudinally extending slots formed in said external face, and a two-part seat ring unit tightly surrounding said seat ring bearing portion, each part providing a seat portion and a closely adjoining, coextensive internal face enclosing the slots to provide gas passages, said seat parts being longitudinally spaced from one another to provide circumferentially spaced ports therebetween at the exposed slot areas.

References Cited in the file of this patent

UNITED STATES PATENTS 2,468,824  Hughey _____ May 3, 1949